Patented Feb. 11, 1941

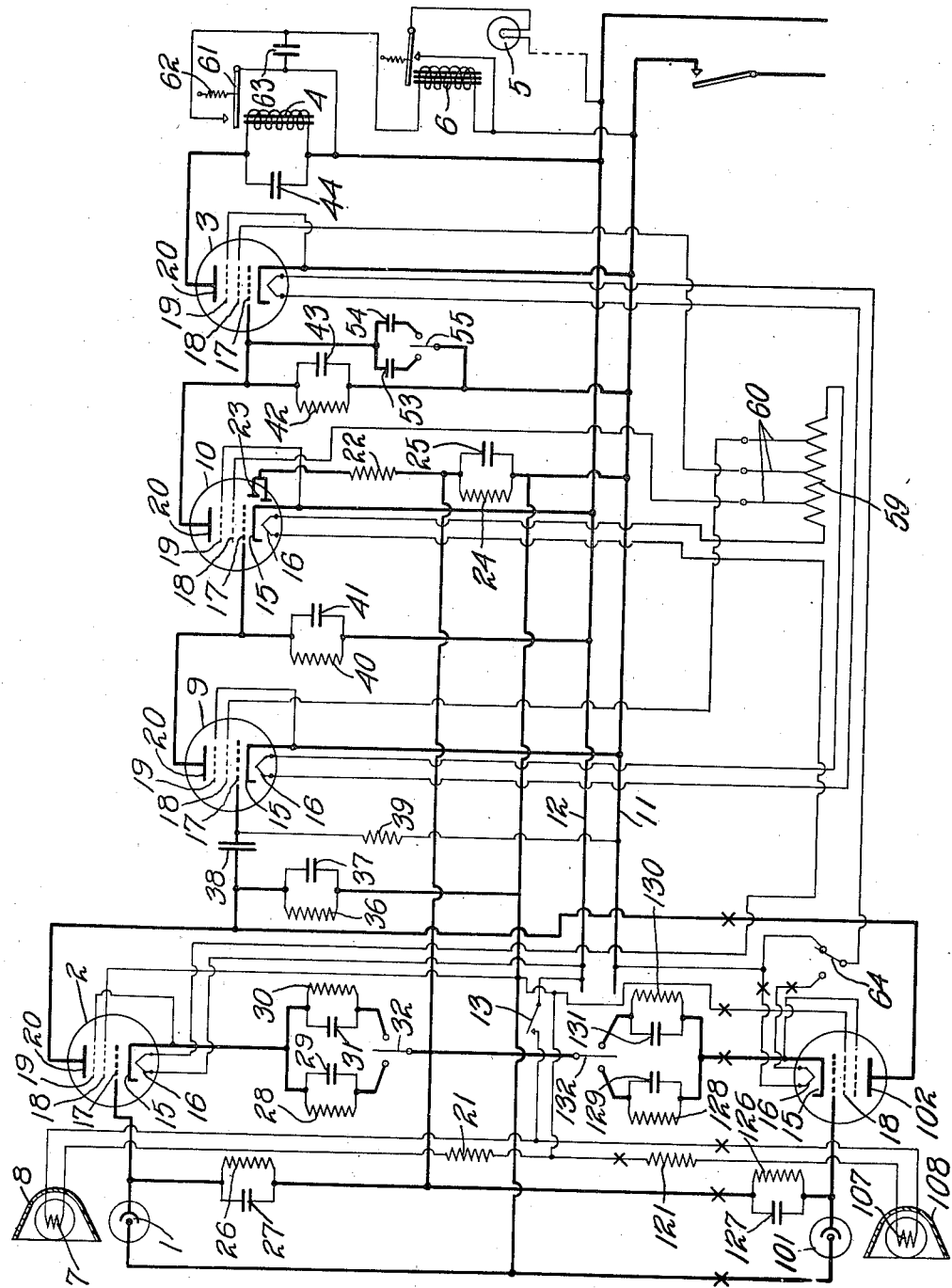

2,231,621

UNITED STATES PATENT OFFICE 2,231,621

PHOTOCELL SYSTEM

Edward S. Goodridge, New York, N. Y.

Application December 1, 1937, Serial No. 177,503

2 Claims. (Cl. 250—41.5)

My invention relates to the control of a signal or other apparatus by one or more photocells. More especially, it relates to photocell systems wherein the photocells respond to indirect light and accordingly to light reflected from and the absorption of light by a passing object or person, rather than to a beam of light directed into the photocell by a remote lamp and broken by a person or other object passing through it. Accordingly, a system of my invention may operate on the incidental lighting of the area within the sight of the photocell, such as sunlight or the light of lamps provided primarily for lighting purposes, or if a lamp is used especially to provide light for the photocell (as when the illumination of the surrounding area is insufficient), this lamp may be located, for example, at one side of the photocell. Accordingly, a system of my invention is particularly adapted to turning on and off lamps illuminating store show windows as persons pass the windows. My invention is not limited to such service, however, as will be apparent.

Generally speaking then, my invention provides a photocell system suitable for controlling the operation of other apparatus and especially one capable of operation on indirect light and light reflected or absorbed by passing objects or persons, and includes adaptability for operation on alternating current house power lines, direct current operation of the photocell or photocells with alternating current amplification of direct current impulses, prevention of inadvertent operation of the system by surges on the power line to such an extent that operation by reflection and absorption of indirect lighting is feasible, compensation for varying intensity of the illumination of the surrounding areas, provision for operation by either reflected or absorbed light, or by reflected or absorbed light alternately, so that the system is adapted for operation both during the day time and during the night, ready means for fixing the period of actuation of the controlled apparatus and for varying such period, adaptability for the use of a plurality of photocells, and other features hereinafter appearing.

The accompanying drawing illustrates diagrammatically a system embodying a preferred form of my invention arranged to illuminate a store show window as persons pass it; other forms and its applicability to other purposes will be understood therefrom.

In describing this system hereinafter, I shall give the numerical values of some of the resistances and reactances that I have used in order that the functions and inter-relations of various parts of the system may be understood clearly by those skilled in these matters; as will be understood also by such persons however, my invention is not limited to the particular values so given.

Generally speaking, a system of my invention has a photocell 1, that is to say an instrument having a resistance to the flow of electric current that is dependent on the amount of light entering it, and, usually, at least two vacuum tubes 2 and 3 to amplify the impulses or variations in current through the photocell 1 and provide sufficient current for operating, say, a relay or electromagnetic switch 4 controlling the supply of current to the controlled apparatus. In the present instance, the controlled apparatus is represented as the electric lamp or lamps 5 which can be assumed to be arranged to illuminate a store show window. Rather than place the contacts of the relay 4 directly in series with the controlled load however, ordinarily I use this relay 4 simply to control a larger electromagnetic switch 6 which directly controls the load circuit, as will be understood and observed from the drawing. The photocell 1 is directed toward the path or paths of the objects to which the controlled apparatus 5 is to respond, in the present instance, the paths of persons passing the show window, and in view of the service to be performed in the present instance the contacts of the switch 6 are normally open so that no current passes to the lamp 5 until a person enters or passes the line of sight of the photocell and then are closed to illuminate the window for a predetermined period of time or until otherwise opened. An electric lamp 7, say constantly lighted during the night time, for supplying light for the photocell, is so placed that a person in the line of sight of the photocell reflects light from it into the photocell; e. g. it may be placed at one side of the photocell. I shield the photocell elements from direct light from the lamp, and usually I direct the light from the lamp 7 onto the object in the line of sight of the photocell by means of a lens or reflector 8 or both. The lamp 7 may be connected to the power line 11—12 through a switch 13 permitting the lamp to be cut off during, say, daylight hours when the system can be operated without it. Ordinarily instead of using simply two vacuum tubes 2 and 3, I employ at least one other pair of such tubes 9 and 10 to give the system greater stability and, more especially, to readily permit use of apparatus for establishing and readily changing the predetermined period of operation of the controlled apparatus 5 on each excitement of the photocell by a passing object as later described. Preferably I use a form of vacuum tube adapted to operate on alternating current and supply the system from the alternating current power line 11 and 12, say the ordinary house lighting circuit at the customary house voltage of approximately 110 volts at 60 cycles. Preferably also, for reasons that will be understood, I usually use vacuum tubes having at least five active elements, namely a cathode 15 heated by a filament 16, a plate-current-controlling grid 17, a screen-grid 18, a third grid 19 for its usual purposes such as to increase the plate-resistance of the tube and which, accordingly, may have the same voltage as the cathode (the connections of the third grids 19 to the respective cathodes may be made internally of the tubes rather than externally as shown in the present drawing), and the plate 20 of the output circuit of the tube.

For an electric lamp 7 supplying light for the photocell, I employ, preferably, one having a concentrated filament because of its greater light-directability. Usually I operate a concentrated filament lamp for this purpose at less than its rated voltage however, because the present concentrated filament lamps have a relatively short life at their rated voltages, and I have found that they operate sufficiently well for my purpose at voltages from 20% to 25% less than their rated voltage, at least where their light is directed toward the object by an efficient lens or reflector 8, and thereby their lives are materially prolonged. Usually therefore for a power line 11—12 of about 110 or 115 volts, I use at 7 a concentrated filament lamp rated at about 110 or 115 volts but connect it to the power line with a resistance 21 in series with it sufficient to cut down the voltage applied to the lamp to about 90 volts.

The photocell 1 is so connected as to establish the voltage on the control grid 17 of the first tube 2, and vary this voltage as the light reaching the photocell varies. Rather than operate the photocell 1 with alternating current, preferably I operate it with direct current, and also, preferably, operate the first tube 2 with direct current. This direct current may be obtained from any source, but preferably I obtain it from the power lines supplying the remainder of the system, and in the case of alternating current power lines 11—12 by using for one of the vacuum tubes, for example the tube 10, a tube that is provided with one or more added "plates" or anodes 23 which are so located as to be effective with the cathode 15 of that tube but substantially uninfluenced by its control grid 17; through a load 24—25 this or these anodes 23 are connected to the side 11 of the power circuit opposite to the side 12 to which the cathode 15 of the tube 10 is connected. The load for this circuit may and preferably does comprise a resistance 24 in parallel with a condenser 25, generally of such values as to produce as continuous a voltage across the terminals of the resistance 24 as reasonably possible, i. e. a direct current voltage as free as reasonably possible of those regular pulsations which otherwise would occur because of the alternating character of the voltage between the conductors 11 and 12. For example, I have used a resistance at 24 of 1 megohm and a capacity at 25 of 4 or 8 microfarads. To minimize, or assist in minimizing, the effects of surges in the lines 11—12 sufficiently to avoid inadvertent operation of the apparatus by such surges, I usually insert a resistance 22 in series with the anode or anodes 23 and the reactance 24—25, the value of this resistance being appreciable and sufficient for the purpose. For such a resistance 22 I have used .1 megohm. Connections to opposite sides of the load 24—25 then constitute, in effect, a source of direct current at a voltage which is dependent on the voltage of the line 11—12, and which changes with those changes of this line voltage that persist for relatively long periods of time but which does not change proportionately with line-voltage changes of relatively short durations.

I connect one side of the photocell 1 to one of the terminals of this direct-current-source impedance 24—25, and the opposite side of the cell 1 connect to the control grid 17 of the first tube 2; and also I connect the latter side of the cell to the opposite terminal of the direct-current source 24—25 through an impedance having a time constant (e. g., T=R×C) that is quite small; specifically, of the order of one-tenth of a second or less. For this reactance, I prefer a resistance 26 and condenser 27 connected in parallel. At 26 I have used a resistance of the order of 40 megohms and at 27 a condenser having a capacity of the order of .001 microfarad, the time constant of the combination being accordingly of the order of .04 second. An impedance of the kind described at this place, preferably with the assistance of a resistance 22, permits the photocell system to be made so sensitive to light changes that it is operable on reflected light and on absorption of indirect lighting of the cell without, at the same time, material danger of inadvertent operation by such ordinary transients on a house power line 11—12 as may reach the connections to the photocell. While I believe that impedances, including impedances formed by a resistance and a condenser in parallel, have been proposed heretofore for the purpose of establishing the necessary voltage difference between the control grid and the cathode of the first amplifier tube, in photocell circuits, I believe that they have all been given time constants materially different from that which I employ, and I believe that I am the first to have discovered that by establishing a time constant of the order indicated at this part of the system, the system may be made operable on reflected light and absorption of light of the surrounding illumination without being materially liable to inadvertent operation by transients of house power lines.

The photocell of a system operating on indirect light being exposed to the illumination of the surrounding area, is subject to the varying intensity of such illumination, and ordinarily the intensity of this surrounding illumination varies not only from daylight to dark but also more or less repeatedly or continuously, although rather slowly for the most part. To prevent such variations in light intensity from operating the controlled apparatus or destroying the effectiveness of the system, I compensate for it as and where necessary, which I contemplate will be usually. To this end I preferably bias the cathode 15 and grid 19 of one of the tubes, and usually and preferably the first tube 2, and arrange to vary this bias in directions to compensate for those changes in the potential of the control grid 17 of the first tube 2 that result from the natural variations in light intensity. To this end I interpose a material value of resistance between this cathode 15 and its grid 19 on the one hand and the source of current for the cathode on the other, so that as the potential of the control grid 17 changes with change in the light intensity, the potential of the cathode 15 and its grid 19 tends to change also, in the same direction, and thus the difference in potential between the control grid and cathode tends to remain constant. It is not necessary that this potential difference be kept exactly constant however; it is only necessary, at best, that for the widest usual changes in intensity of illumination of the area sighted by the photocell, this potential difference be kept at a value less than is sufficient to bring the controlled apparatus 5 into action and at such a value that the passing of a person or other object through the line of sight of the photocell will bring the controlled apparatus into action. For a show window beside a street and with some standard pentode tubes and other apparatus as herein indicated, I have found a resistance of the order of 1 megohm is sufficient for operation during the night time, and a resistance of an order of 5 megohms is sufficient for day times. Along with this resistance, I employ reactance so that by reason of a time constant in this circuit a sufficient potential difference to bring the controlled apparatus into action may be created by the passing of a person or other object through the line of sight. It is immaterial whether the resistance be inherent in the reactance element or elements or be a separate element of the impedance. So far as concerns compensation for natural changes in the intensity of the light, as above described, it is only necessary that the time constant of the impedance be sufficiently small to permit the potential of the cathode-grid 15—19 to follow the potential of the control grid with changes in light intensity as described. For show window work as mentioned, I have found that a time constant (T=R×C) of 25 seconds is sufficiently low, but in any instance its maximum possible value depends on the rate of natural change in the light intensity as will be understood. Otherwise than this, I make the value of this time constant such as to secure operation by a person or other object passing through the line of sight of the photocell. Preferably I use a resistance 28 (or 30) in parallel with a capacity 29 (or 31) for this impedance. For operation on reflected light (e. g., for the operation of show window lights during the night time by means of light from lamp 7), I give this reactance a time constant large enough, say of the order of 25 seconds, to cause the appearance of a person in the line of sight of the photocell to produce such a rise in potential of the first control grid 17 with respect to its cathode 15 as to actuate the system; e. g., I have used a resistance 28 of 1 megohm and a condenser 29 having a capacity of 25 microfarads. This relative rise of potential of the first grid 17 due to the reflection of light into the photocell by a person or other object in the line of sight of the photocell increases (or causes) current flow from the first plate 20 and accordingly (with the present system arrangement) brings the controlled apparatus 5 into operation. If there is another source of illumination from which the passing object can reflect sufficient light into the photocell, of course the lamp 7 can be omitted. However, during, say, the day light hours when the surrounding area is more intensely illuminated, the effect of the lamp 7 is less, and regardless of whether or not this lamp 7 is lighted the appearance of a person in the line of sight of the photocell may reduce the total amount of light reaching the cell, thus reduce the positive potential of the first control grid 17 and accordingly reduce the tendency for current to flow in the circuit of the first plate 20. This calling for an arrangement capable of operating the system on the absorption, as it were, of light by the passing body, I preferably arrange to extinguish the lamp 7 during the daylight hours (switch 13) and employ two sets of impedances, one 28—29 for reflected light (e. g. night) operation as described and another (e. g. 30—31) for absorbed light (e. g. day) operation, with a switch 32 for connecting either in circuit, although the use of both is not a necessary feature of my present invention as will be apparent. For the absorbed-light (e. g. day) operation, I employ a bias impedance having such a lower time constant as allows the bias of the cathode 15 and grid 19 to change materially during the time taken for a person to pass through the line of sight at normal speed. Accordingly the lighting of the photocell I by the natural illumination of the surrounding area holds, normally, the first grid 17 at some certain potential with reference to the cathode 15, the entrance of a person into the line of sight of the photocell reduces the potential of both this grid and cathode, but the departure of the person from the line of sight permits the outside illumination to restore the (positive) charge of the grid 17 to its initial normal or average value immediately while the reactance 30—31 delays the return of the cathode 15 and grid 19 to their normal potential, so that as a result there is momentarily an increase in the positiveness of the grid 17 with respect to the cathode which causes a momentary flow (or increased flow) of current through the first plate circuit 20 to start the system and controlled apparatus into operation. As before indicated, I prefer a resistance 30 with parallel connected condenser 31 for this absorbed-light or day impedance. I have used a resistance 30 of 5 megohms and a condenser 31 of 1 microfarad, and accordingly a time constant of 5 seconds. As will be understood however this time constant in any particular instance will depend on the width of the line of sight of the photocell and the speed of the passing objects as well as other factors.

As before indicated I preferably amplify by additional tubes the effect of the change (here increase) in the plate current of the first tube 2 as a person or other object appears in (or departs from) the line of sight of the photocell. Preferably these additional tubes are supplied with alternating current, the system as a whole then operating as alternating current amplification of direct current impulses. As before indicated also, I prefer to feed from tube 2 into a tube 9. The coupling load may be a resistance 36 and parallel condenser 37; with some standard pentode tubes I have used a resistance 36 of 5 megohms and a condenser 37 of .05 microfarads, together with a coupling condenser 38 of .25 microfarad and a grid leak 39 of 20 megohms. Also, I preferably feed from tube 9 into a third amplifying tube 10 by a parallel resistance-condenser load 40—41 (of, say, .1 megohm and 0.5 microfarad), and from tube 10 to a fourth amplifying tube 3 by a parallel resistance-condenser load 42—43 (of, say, 10 megohms and .05 microfarad). The plate circuit of the last tube 3 supplies the coil of the relay 4, the latter preferably paralleled by a condenser 44 having a capacity of the order of, say, 8 microfarads to act as a filter and reduce surges, particularly such as may originate from the inductance of the relay coil. These tubes 9, 10 and 3 may be connected to the power lines 11—12 in a reverse manner alternately, for example the cathodes 15 of tubes 9 and 3 and the plate 20 of tube 10 being connected to conductor 11 (to which, in effect, the plate 20 of the first tube 2 is connected) and the plates 20 of tubes 9 and 3 and the cathode 15 of tube 10 being connected to conductor 12. The filaments 16 of all the tubes may be connected in series with each other, and in series with a resistance 59 connected across the power line 11—12; the resistance 59 is of such value as to provide the proper lower voltage for the filaments. The screen grids 18 can be biased in any suitable manner, for example by connection to appropriate taps 60 from resistance 59, as will be understood.

Preferably the elements of the first tube 2 are so biased that the circuit of its plate carries little or no current normally, that is to say, while there is no person in the line of sight of the photocell and when none has just left that line of sight. With this biasing and the circuit connections illustrated, the plate circuit of the second tube 9 carries its maximum current at this time, the plate circuit of tube 10 its minimum current, and the plate circuit of tube 3 its maximum, and accordingly when (in the night time) a person enters the line of sight of the photocell or (in the day time) leaves that line of sight, the plate currents of tubes 2 and 10 increase while the plate currents of tubes 9 and 3 fall. Preferably to fix the period of time during which the controlled apparatus 5 is maintained in action when once brought into action (or to fix the period during which the controlled apparatus is held out of action), I employ a reactance which, by its charging and discharging, may measure the period and in order to be able to readily change the length of each period of action I preferably employ a plurality of reactances with a switch arrangement for connecting one or more in circuit as may best suit the particular situation. Preferably I employ condensers for such reactances, and as before indicated the extra pair of tubes 9 and 10 are employed in part for the purpose of permitting the use of such period-determining apparatus as I prefer without encumbering the first tube 2 with it. In brief, I employ, preferably, a condenser or condensers that receive a charge when the photocell is excited by a person or other object at its line of sight and which acts on the grid of one of the amplifying tubes to hold the controlled apparatus 5 in action until the condenser or condensers are discharged. Condenser 43 is such a condenser, and if of proper size is sufficient for any one predetermined period of time. In order to be able to vary the active period however (due to different lengths of show windows, etc.) I usually supplement such a condenser by one or more others, 53, 54 (say of .05 and .25 microfarad respectively), together with a switch 55 for connecting one or more of these additional condensers in the circuit, say in parallel with 43. By simply shifting the switch 55 therefore, the total capacity effective on the control grid of, say, the last tube 3 can be varied and thereby the lengths of the periods of operation of the controlled apparatus 5 can be varied. Obviously other arrangements for opening the circuit of the controlled apparatus can be substituted, however, but I prefer the arrangement indicated for its simplicity.

The armature or movable element of the relay 4 is indicated at 61. As before indicated the arrangement of the system illustrated is such that the circuit of the plate 20 of the last tube 3 carries its maximum current under normal conditions, i. e. when no person or other object has passed into the line of sight of the photocell 1. Accordingly the armature 61 is attracted at such times, but since the apparatus 5 is not to be operated at such times, the movable element 61 of the relay illustrated is biased to closed position as represented by the spring 62; that is to say, its contacts which energize the switch 6 are so arranged as to close when the passage of an object through the line of sight of the photocell 1 reduces the current in the plate circuit of this tube 3 and thereby the spring 62 is permitted to move the movable element 61. The energization of the switch 6 closes the circuit through the controlled apparatus here represented by one or more lamps 5 arranged to illuminate a store show window as will be understood from the drawing. Across the output circuit of the relay 4, I preferably place a condenser 63 to not only reduce the arcing at the contacts of this relay, but also I find that a suitable condenser at this place helps to reduce surges reflected back into the amplifying system from the inductive circuit containing the coil of the power relay 6. Usually I use a condenser 63 of the order of one microfarad.

The above description applies to the use of a single photocell 1, and for the purposes of that description it can be assumed that the switch 64 is in the position indicated and that various conductors are open at the parts marked X in the lower lefthand portion of the drawing. Frequently however it will be desirable to employ more than one photocell, say one at each end of a show window so that the show window will be lighted as a person passes it in either direction, and additional photocells may be added to the system described. In multiple cell systems I use, generally, an individual first tube (corresponding to tube 2) for each photocell in order to have an amplifying tube as close to each photocell as reasonably possible, and generally speaking each such additional photocell arrangement is connected in parallel to the first photocell 1 and its tube 2 above described when it is desired that each photocell shall control the actuation of the controlled apparatus. Thus in this second photocell arrangement, the second photocell itself will be recognized at 101, and also its individual projection lamp 107, with reflector 108, and its amplifying tube 102; these elements are related to each other in the same manner as the elements 1, 2, 7 and 8. The load 126—127 of cell 101 is like the load 26—27 of cell 1, and the biasing impedances 128—129, 130—131 and switch 132 of photocell 101 are like 28—29, 30—31 and 32 and serve the same purposes. The connection of this second photocell arrangement to the system described may be made by means of plugs and sockets, say at the points marked X; the second impedances 128—129 and 130—131 may be similarly excluded from the system when only photocell 1 is used, but usually I build these impedances into the case containing the tubes 9, 10 and 3 and therefore I have shown them permanently connected in the system in the present instance. A switch 64 or other convenient arrangement provides for the connection of the filament 16 of tube 102 in series with the filaments of the other tubes at will.

It will be observed that during operation of the system on light reflected by the lamp 7, a person or other object standing for a time within the line of sight of the photocell 1 may cause the potential of the cathode 15 of the first tube 2 to rise appreciably and the charge of its condenser 29 to be increased appreciably above normal.

As the person or other object then passes from this line of sight, the current in the plate circuit of this tube 2 falls to a subnormal value, since the potential of its control grid 17 falls substantially immediately but the potential of its cathode 15 falls more slowly due to the time constant of its biasing impedance 28—29. The reaction of this cathode impedance is then to restore this plate current to its normal value, and this increase in plate current is of course a change in a direction tending to bring the controlled apparatus into action. To avoid bringing the controlled apparatus into action by such a reaction, the plate load 36—37 and coupling unit and leak 38—39, may be given such related values that the impulse of increasing-plate current due to a person entering the line of sight suffices to bring the controlled apparatus into action as desired and before described, but at the same time given such values that the impulse due to the restoration of the plate current of tube 2 from subnormal to normal value is insufficient to produce a sufficient response in tube 9 to bring the controlled apparatus into action. For example, reducing the capacity of condenser 38, and also reducing the value of the resistance at 39, tends to prevent operation of the controlled apparatus by such reaction of the biasing impedance. As an alternative, the bias of the screen grid 18 of tube 9 might be changed. Of course the same reaction phenomenon may occur in the biasing impedance 129—129. In brief, to avoid operation of the controlled apparatus by such a reaction in the biasing impedance, there should be such a relation between the biasing impedance on the one hand and the supply circuits and biasing of the amplifying circuit on the other hand, that the impulse caused by a person or other object reflecting light into a photocell is sufficient to bring the controlled apparatus into action, but the impulse due to the reaction of the cathode-biasing impedance is insufficient for this purpose.

It will be understood that my invention is not limited to the details of construction and operation described above and illustrated in the accompanying drawing, except as appears hereinafter in the claims.

I claim:

1. A photocell system having a photocell, an amplifying system controlled by said photocell and including at least one tube, said tube having an anode influenced by the grid of the tube and included in the amplifying system and another anode substantially uninfluenced by said grid of the tube, apparatus controlled by said amplifying system, and means to supply direct current to said photocell from said other anode and alternating current to said amplifying system and tube, whereby direct current impulses of the photocell are amplified by alternating current.

2. A photocell system having a photocell to operate on indirect light, an amplifying system including at least one tube having a control grid and cathode, apparatus controlled by said amplifying system, and an impedance including resistance in series with said cathode, the value of said resistance being sufficiently high to maintain, as the intensity of the light to which the photocell is subjected varies, the difference in potential between said grid and cathode at a value less than sufficient to exercise control on said apparatus, and the time constant of said impedance being sufficiently low to enable the maintenance of such a low potential difference as the intensity of the indirect lighting varies naturally but sufficiently high to cause a potential difference sufficient to exercise control on said apparatus when an object passes through the line of sight of the photocell.

EDWARD S. GOODRIDGE.